June 21, 1960   J. B. GLENNON ET AL   2,941,493
ANTI-TORPEDO DEVICE
Filed June 1, 1942   10 Sheets-Sheet 1
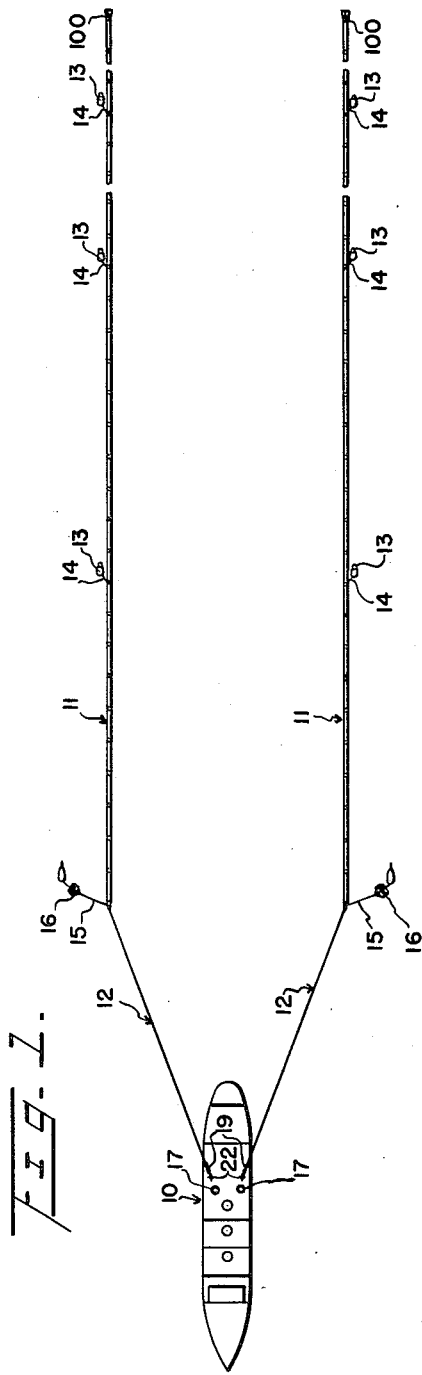
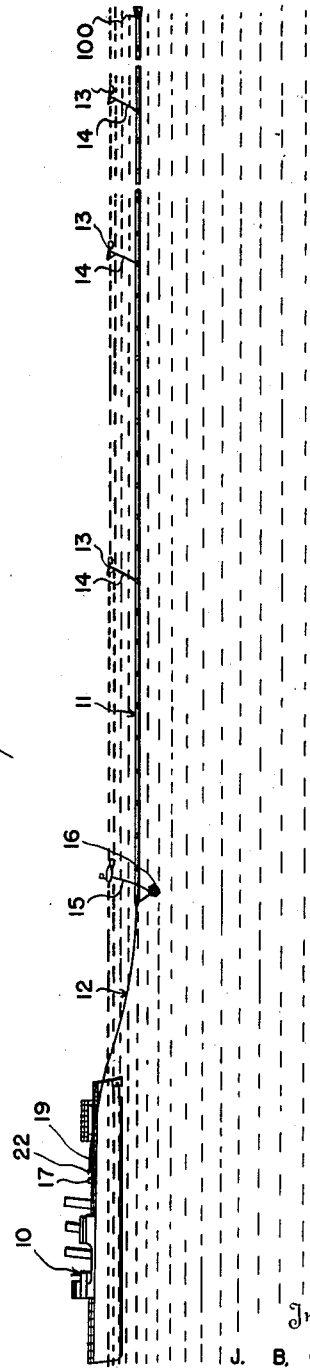
Inventors
J. B. GLENNON
R. H. PARK
N. N. ESTES
H. W. KLAS
Attorney

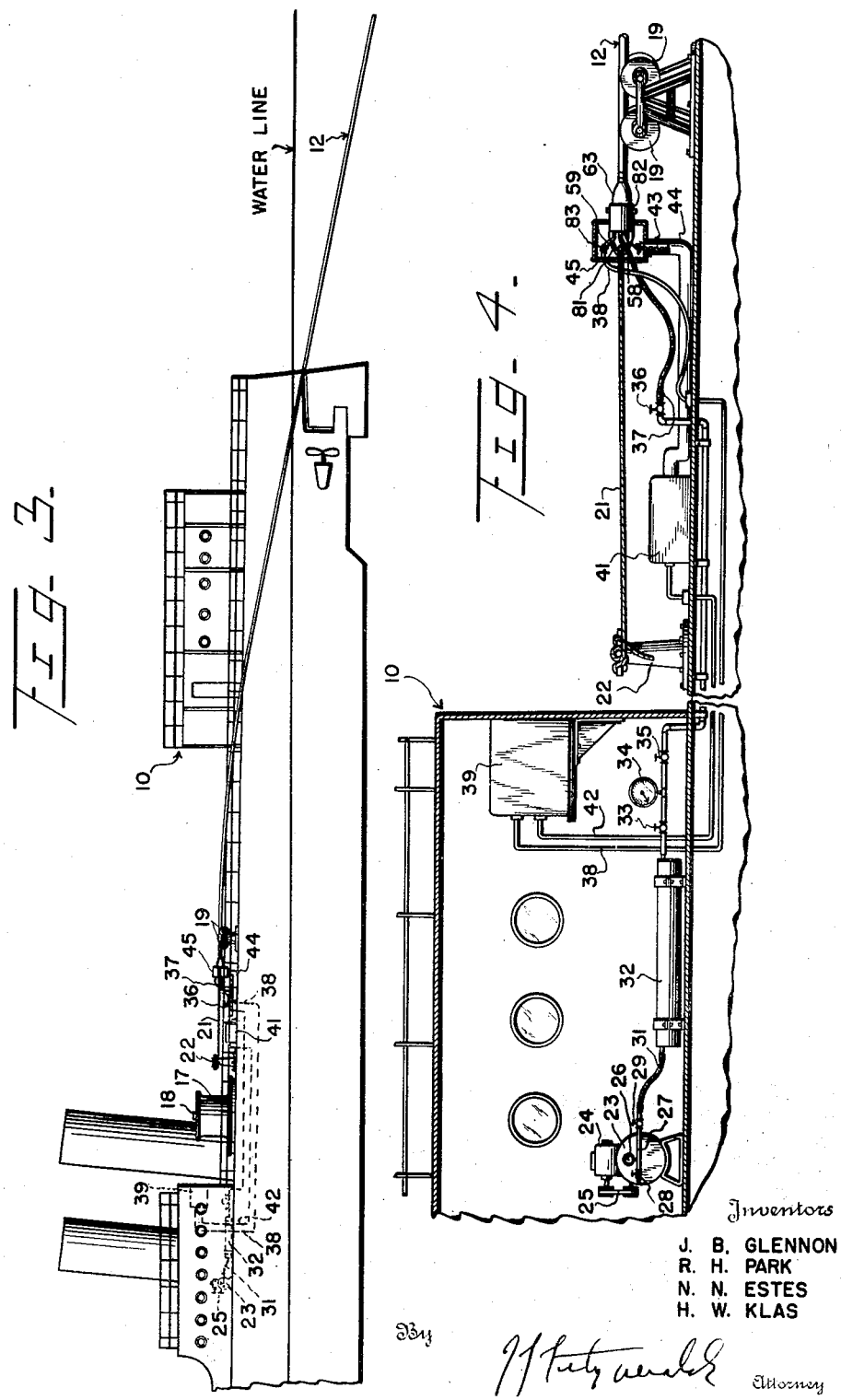

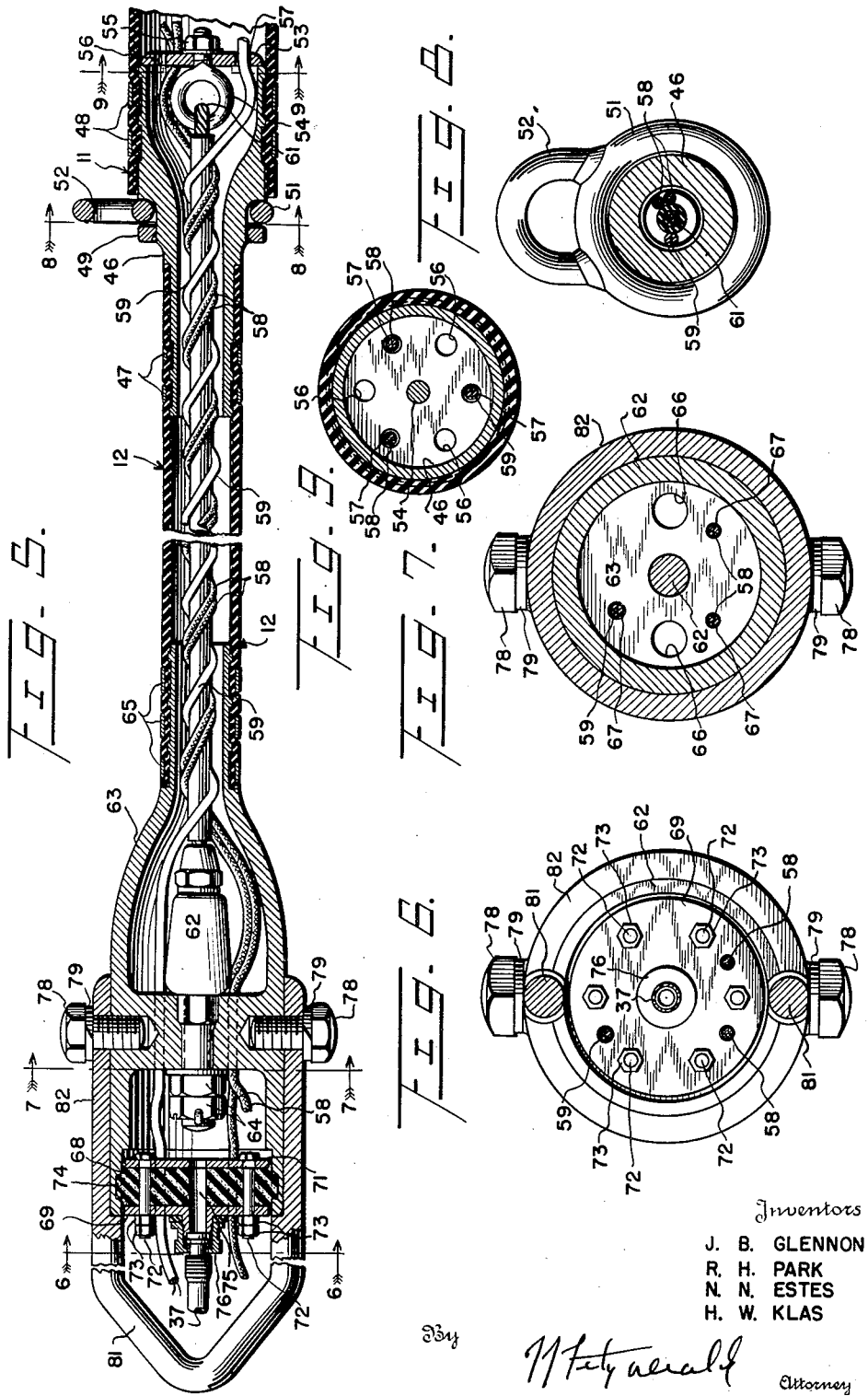

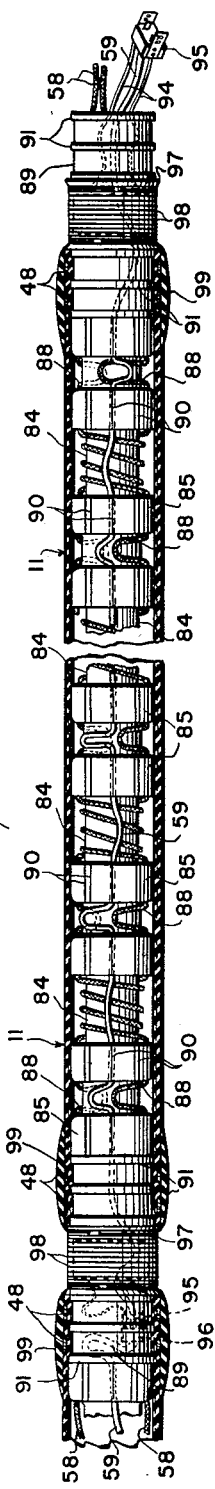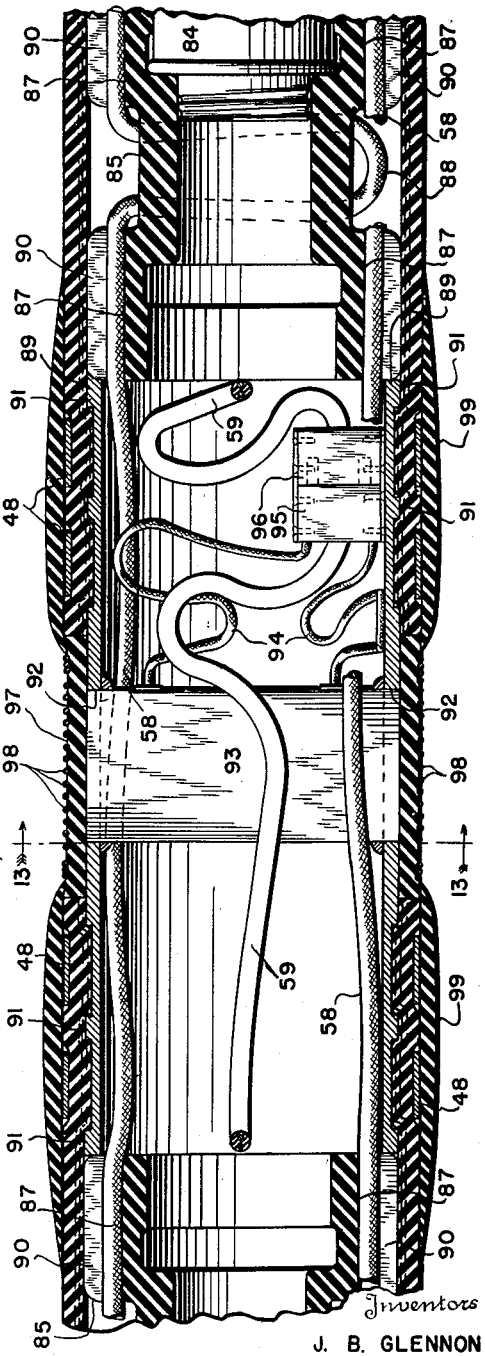

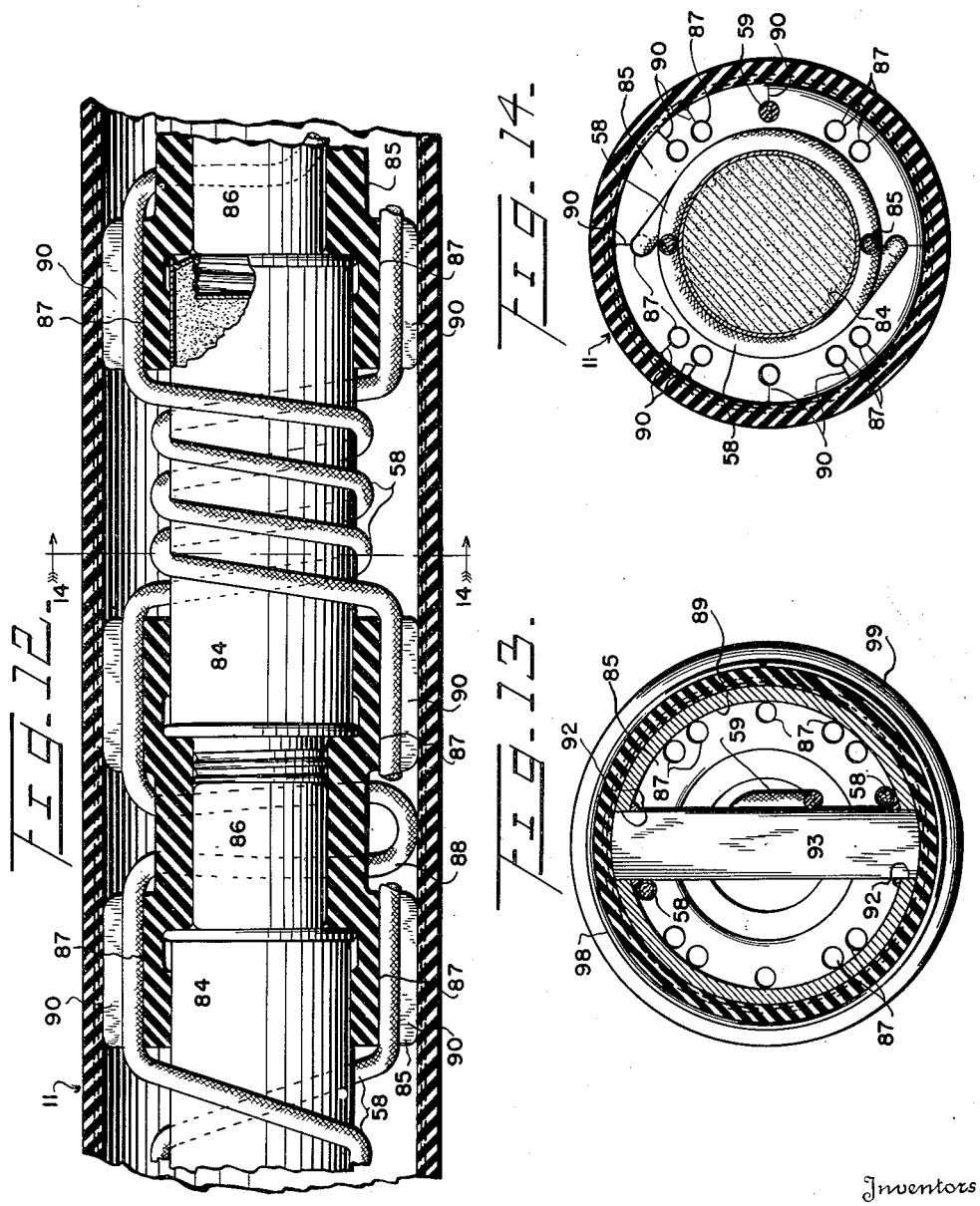

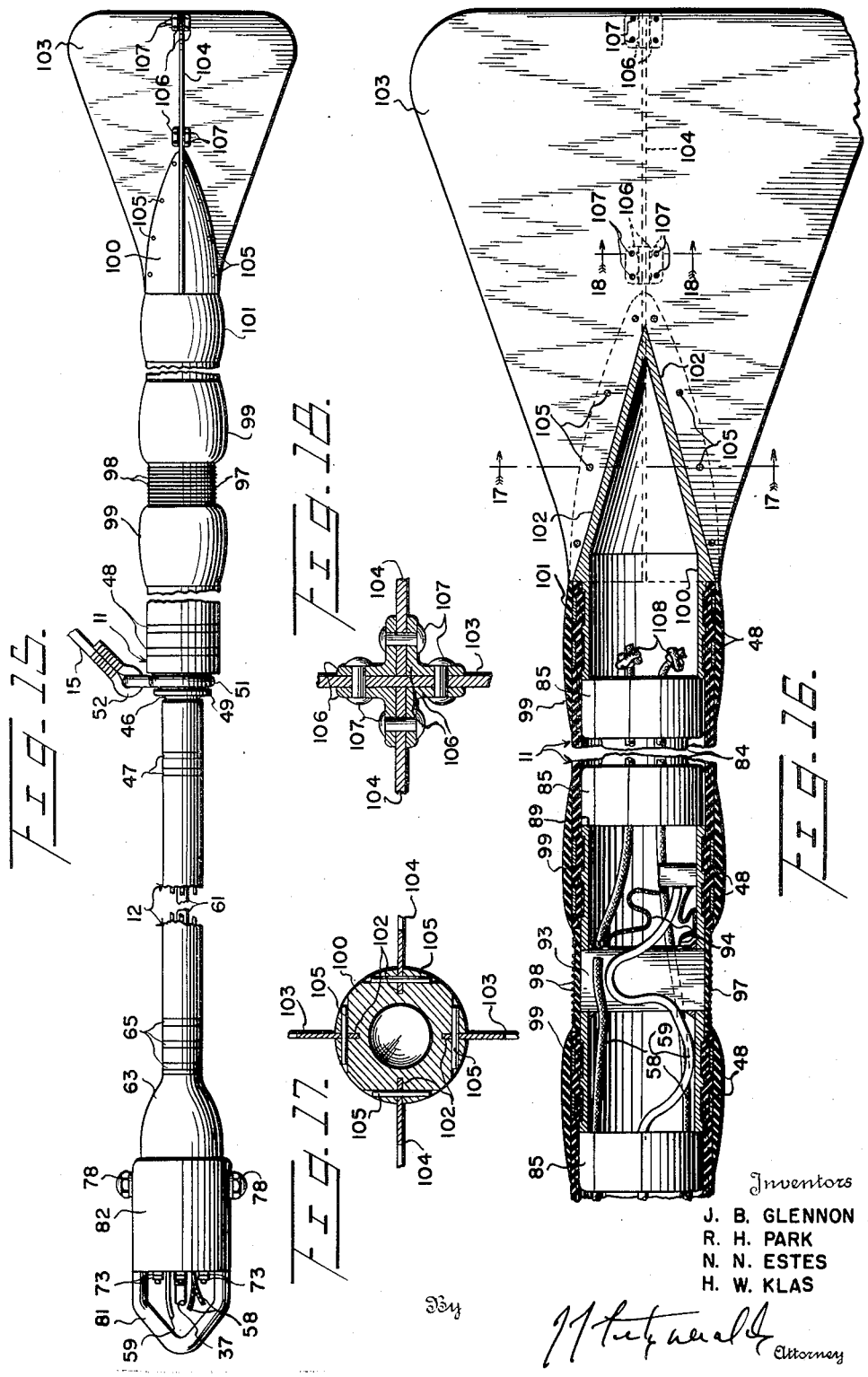

June 21, 1960
J. B. GLENNON ET AL
2,941,493
ANTI-TORPEDO DEVICE
Filed June 1, 1942
10 Sheets-Sheet 7
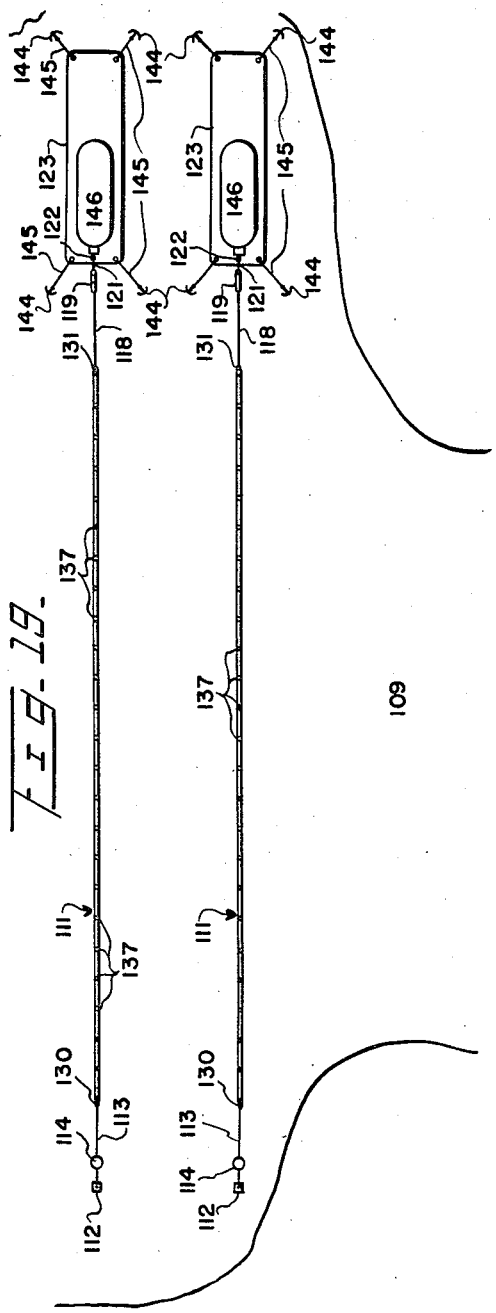
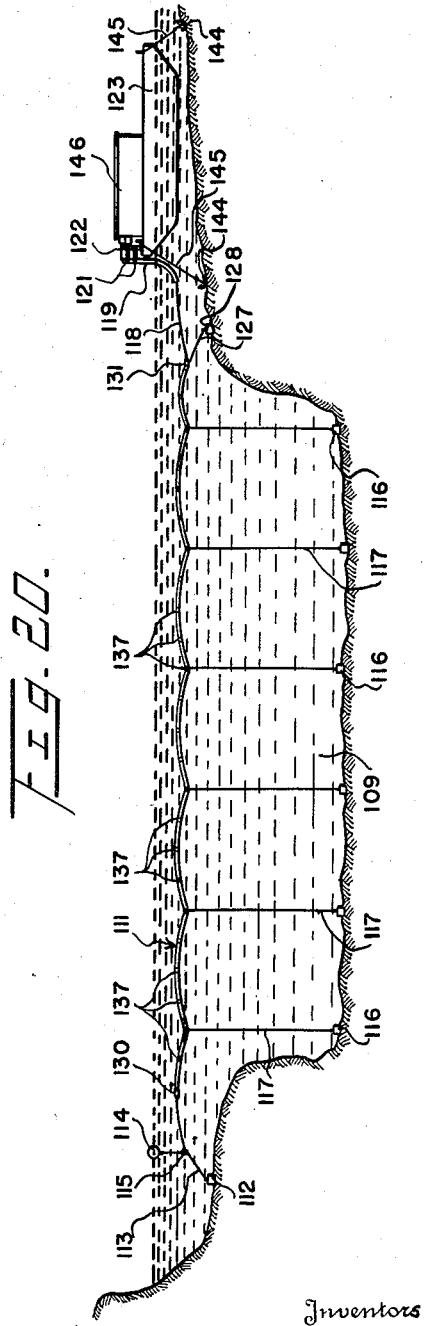
Inventors
J. B. GLENNON
R. H. PARK
N. N. ESTES
H. W. KLAS
By [signature] Attorney

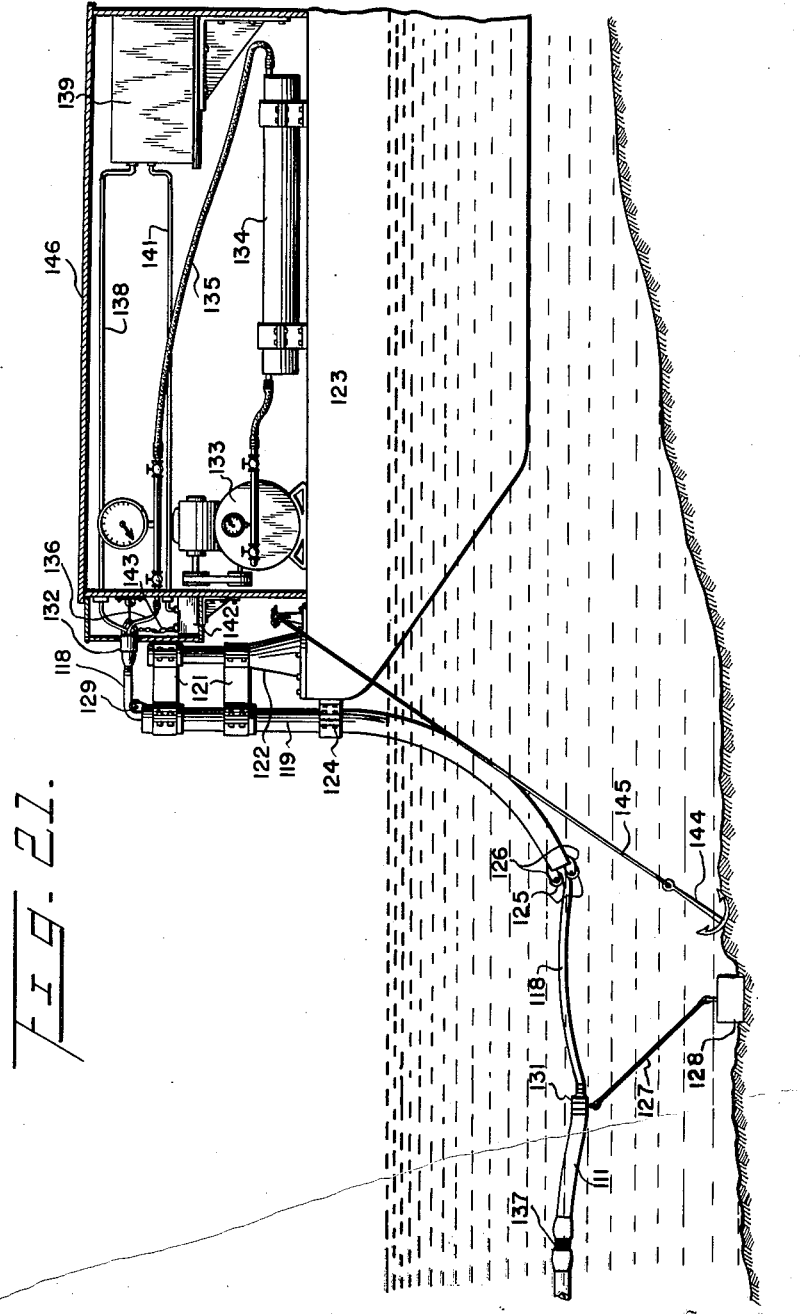

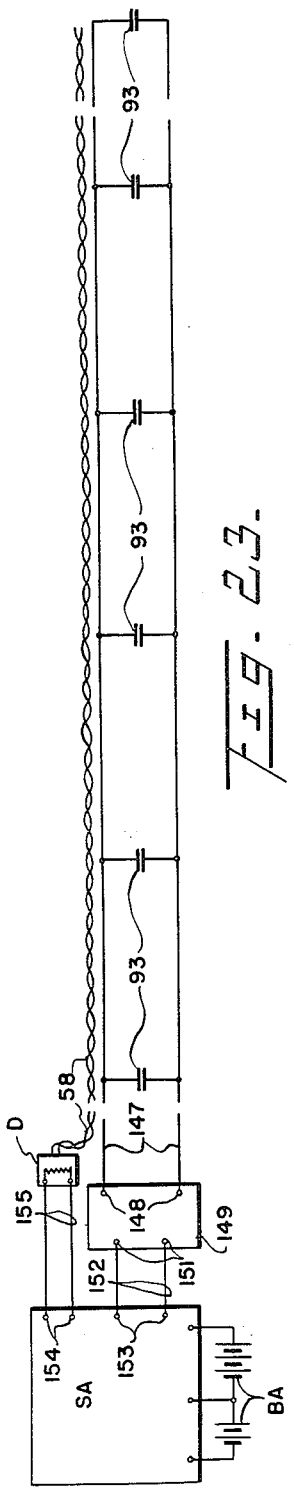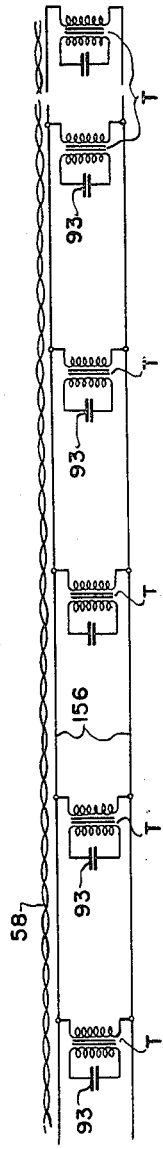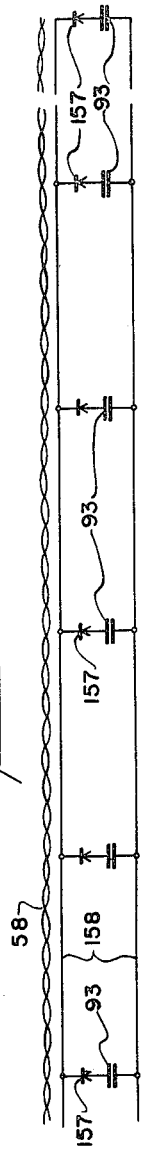

June 21, 1960   J. B. GLENNON ET AL   2,941,493
ANTI-TORPEDO DEVICE

Filed June 1, 1942   10 Sheets-Sheet 10

Inventors
J. B. GLENNON
R. H. PARK
N. N. ESTES
H. W. KLAS

Attorney

United States Patent Office 2,941,493
Patented June 21, 1960

2,941,493

ANTI-TORPEDO DEVICE

James B. Glennon, Washington, D.C., Robert H. Park, Pluckemin, N.J., Nelson N. Estes, Austin, Tex., and Harold W. Klas, Lansing, Mich.

Filed June 1, 1942, Ser. No. 445,370

33 Claims. (Cl. 114—240)

(Granted under Title 35, U.S. Code (1952), sec. 266)

This invention relates generally to anti-torpedo devices for the protection of vessels, and particularly to devices arranged within the water at a distance from the vessel in which means are employed for detecting the approach of a torpedo thereby to fire an explosive charge adjacent the moving torpedo sufficient to deflect or destroy the same when it has approached sufficiently near the device.

Various devices have heretofore been proposed for protecting a vessel from the ravage of a torpedo, such devices comprising barriers composed of heavy plates, nets, chains, rods, springs, rotatable disks and the like secured to the vessel by booms or similar mehanisms, other devices for preventing an attack by a torpedo including compartments or "blisters" attached to or formed integrally with the hull of the vessel, or a copious quantity of resilient material attached to the hull of the vessel thereby either to deflect the torpedo or to absorb the shock of impact thereof, as the case may be. Such devices have generally proved unsatisfactory in service by reason of the complicated mechanisms employed and the considerable reduction in the mobility and speed of the vessel with which the devices are associated, and for the additional reason that modern torpedoes have in recent years increased in size, rate of travel through the water and in firing power to such an extent that these devices are no longer regarded as completely effective in protecting a vessel against the modern torpedo.

In the system of the present invention the anti-torpedo device comprises a flexible hose or tube of material suitable for the purpose such, for example, as rubber or rubber coated fabric adapted to be attached to a moving vessel or moored within the water and maintained at a predetermined depth of submergence within the water by controlling the degree of pneumatic pressure within the hose and by means of suitable floats secured at intervals thereto. The hose supports a plurality of microphonic devices in communication with the water through the medium of a flexible rubber sleeve arranged about each of the microphones respectively and adapted to exclude water therefrom, the microphones being in operative electrical connection with a filter device connected to a signal amplifying device adapted to amplify signals of predetermined characteristic received from the torpedo when the torpedo is within a predetermined distance of the microphones thereby to fire a detonating fuse and explode an explosive charge arranged within the flexible tube. The flexible tube is hermetically sealed at the trailing end and throughout the length of the tube and provided with a supply of compressed air sufficient to maintain the tube in a predetermined buoyant condition and prevent the collapse thereof by the pressure of the water within which the tube is immersed.

When employed with a moving vessel for protecting a convoy the tubes may be advantageously arranged in pairs, each tube of the pair being preferably maintained in spaced relation with respect to the other tube of the pair by deflecting plates, hereinafter referred to as otter boards, arranged within the water and adapted to maintain a predetermined degree of separation between the tubes as the vessel moves through the water. Means are also provided for dehydrating the air supplied to the tubes thereby to prevent the formation of water therein by condensation of the air within the tubes. The buoyancy of the tube within the water is adjusted to a predetermined value by suitable weights arranged at intervals within the tube and additionally adjusted by the degree of pressure of the air within the tube.

Each of the tubes contains, in addition to the microphones, an explosive charge, the tube being hereinafter referred to as a firing tube. Each firing tube is connected at the leading end thereof to a flexible tube of somewhat smaller diameter adapted to supply compressed air to the firing tube and having arranged therein the signal conductors from the various microphones, the priming fuse employed for detonating the explosive charge within the firing tube, and a flexible steel cable attached to the leading end of the firing tube thereby to establish a mechanical connection between the firing tube and the vessel. An arrangement is thus provided in which the towing strain is removed from the tube connecting the firing tube to the vessel.

The microphones employed within the firing tube are preferably of the piezo-electric or crystal type adapted to respond to pressure impulses in the supersonic range received through the water and to generate electrical signals corresponding thereto. It will, of course, be understood that, if desired, other types of microphones may be employed in which signals within the sonic range received from the moving torpedo cause the explosive charge within the firing hose to be exploded adjacent the torpedo.

The firing hose and depth control devices secured thereto are preferably streamlined to avoid the generation of signals due to the turbulence of the water as the device is towed therethrough by the vessel of sufficient strength to cause the explosive charge to be fired. Furthermore, by employing supersonic detecting devices within the firing tubes, there is no possibility of prematurely exploding the explosive charge as a result of maneuvering the towing vessel such, for example, as is the general practice during a bombing attack by enemy craft.

One of the objects of the present invention is to provide means towed by a vessel for detecting supersonic signals originated by a moving torpedo and destroying the torpedo when the signals have reached a predetermined degree of strength.

Another of the objects is the provision of a flexible hose having means for destroying a torpedo when the torpedo has approached within a perdetermined distance of the hose and new and improved means for controlling the buoyancy of the hose in the water.

A further object is the provision of means for quickly paying out a firing hose of the character disclosed and storing the firing hose on a vessel when not in use.

Still another object is the provision of new and improved means for mounting a detecting microphone within a flexible hose in which the generation of supersonic signals of predetermined strength by the passage of the hose through the water is prevented.

Still another object is the provision of an anti-torpedo device of the character disclosed which will be economical to manufacture, reliable in operation and which possesses all of the qualities of ruggedness, durability and adaptability to a vessel forming part of a convoy without substantial reduction of the speed of the vessel.

Still other objects, advantages and improvements will be apparent from the following description taken in connection with the accompanying drawings of which:

Fig. 1 is a plan view of a vessel provided with the anti-torpedo device according to a preferred embodiment of the invention;

Fig. 2 is a view in elevation of the vessel and the anti-torpedo device of Fig. 1;

Fig. 3 is an enlarged view of a portion of the vessel of Fig. 1 showing certain control and storing devices employed with the present invention;

Fig. 4 is a sectional view greatly enlarged and partly broken away of the control mechanism of Fig. 3;

Fig. 5 is an enlarged view in section partly broken away of the supply hose and flexible cable therein employed for towing the flexible firing hose;

Fig. 6 is a view taken along the line 6—6 of Fig. 5;

Fig. 7 is a view taken along the line 7—7 of Fig. 5;

Fig. 8 is a view taken along the line 8—8 of Fig. 5;

Fig. 9 is a view taken along the line 9—9 of Fig. 5;

Fig. 10 is a view partly in section and partly broken away of a length of firing hose completely assembled in connected relation with an adjacent length of hose;

Fig. 11 is a sectional view of one of the hose couplings of Fig. 10 connecting two lengths of firing hose and having a microphone arranged therein;

Fig. 12 is a view in section of a fractional part of a length of firing hose showing the explosive charge and the compensating weights arranged therein;

Fig. 13 is a view partly in section taken along the line 13—13 of Fig. 11;

Fig. 14 is a view taken substantially along the line 14—14 of Fig. 12;

Fig. 15 is a view partly broken away of the complete firing hose with the towing cable and supply hose attached;

Fig. 16 is an enlarged view partly broken away and partly in section of a portion of the firing hose and the tail therefor;

Fig. 17 is a sectional view taken along the line 17—17 of Fig. 16;

Fig. 18 is an enlarged view in section taken along the line 18—18 of Fig. 16;

Fig. 19 is a plan view showing an alternative arrangement suitable for use with the present invention for protecting the entrance to a harbor or the like;

Fig. 20 is a view in elevation of the arrangement of Fig. 19;

Fig. 21 is an enlarged view partly in section and partly broken away showing the control mechanism employed with the arrangement of Fig. 19;

Fig. 22 illustrates in diagrammatic form an electrical circuit arrangement suitable for use with the present invention;

Fig. 23 illustrates diagrammatically an alternative circuit arrangement for connecting the microphones within the firing hose;

Fig. 24 illustrates diagrammatically still another alternative circuit arrangement for connecting the various microphones within the firing hose;

Figure 25:
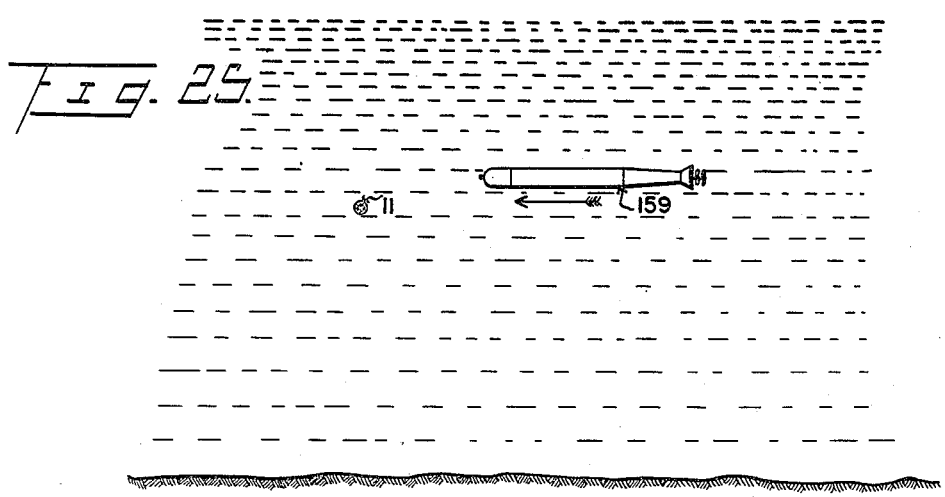
Fig. 25 shows a torpedo approaching the firing tube.

Referring now to the drawings of which like numerals of reference are employed to designate like parts throughout the several views and more particularly to Figs. 1 and 2 thereof there is shown thereon a vessel indicated generally by the numeral 10 having attached thereto a pair of flexible streamers or firing hoses indicated generally by the numeral 11, the towing members 12 secured to the leading end of the firing hoses being provided for this purpose. The firing tubes are maintained at a predetermined depth of submersion within the water by a plurality of floats 13 secured thereto in any suitable manner as by the connecting cable 14. The leading end of the firing hose is connected as by the cable 15 preferably to a somewhat larger float of any suitable type such, for example, as the type known in the art as an oropesa float of sufficient buoyancy to prevent the leading end of the cable from sinking within the water beyond a predetermined depth of submergence therein. The streamers or firing tubes 11 are maintained in predetermined space relation with respect to each other during the towing process by suitable water deflecting devices or otter boards 16 secured to the cable 15 and inclined at an angle with respect to the direction of movement of the vessel 10 such that the firing tubes are maintained separated from each other at all times during the towing process.

The towing member 12 comprises a flexible tube or hose preferably of somewhat smaller diameter than the firing tube 11 within which is arranged a steel cable adapted to take up the strain of towing the firing tube 11 through the water, the towing member 12 also being in operative connection with a copious supply of compressed air whereby the firing tube is continuously maintained in a predetermined degree of inflation thereby to control the buoyancy thereof and prevent the collapse of the firing tube by the pressure of the surrounding water. As will hereinafter be described in more complete detail, the firing tube is provided with a plurality of microphonic devices adapted to pick up supersonic signals from the surrounding water such, for example, as may originate from a torpedo and generate electrical impulses corresponding thereto which pass through a filter device and thence into a suitable signal amplifying device thereby to fire a detonating fuse extending throughout the length of the firing hose and cause an explosive charge arranged therein to be exploded within the proximate vicinity of the torpedo.

On Figs. 3 and 4 is shown in somewhat enlarged form the towing and control mechanism employed with the firing tubes together with the means employed for storing the firing tubes on the vessel before lowering them into the water. On Fig. 3 is shown a reel 17 supported for rotative movement as at 18 about which the towing member 12 and the firing tube are wound prior to the launching of the same within the water. When it is desired to launch the firing tube and towing member 12 within the water the firing hose is unwound from the reel and passed over the sheaves 19 and lowered from the vessel into the water preferably while the vessel is under way, it being, of course, understood that the floats are attached as desired to the firing tube at predetermined intervals thereon after the tube has been unwound from the supporting reel, suitable supporting devices being preferably provided at predetermined intervals along the firing hose to facilitate connection of the floats thereto. The towing member 12 is connected to the vessel in any suitable manner as by the cable or line 21 secured thereto and attached to the towing post 22.

The control equipment comprises, among other elements, an air compressor 23 having a source of energy such, for example, as the electric motor 24 connected thereto as by the belt 25 passing over the pulleys secured to the motor and to the air compressor respectively. The air compressor may also be provided with a gauge 26 for registering the degree of pressure therein, the gauge being in operative connection with a tube or pipe 27 having valves 28 and 29 thereon through which the air to each of the firing tubes is adapted to pass, the valve 29 being connected as by the tube 31 to a dehydrating device 32 comprising a storage tank filled with suitable dehydrating material as is well known in the art thereby to remove moisture from the air passing therethrough. The outlet from the dehydrating chamber is connected to a valve 33 from whence the air passes to an air gauge 34 and through the valves 35 and 36, the air pressure being maintained within the firing hose and towing member by reason of the flexible tube 37 having one end thereof in connection with the valve 36 and the other end operatively connected to the towing member 12. The valves 29, 33, 35 and 36 are provided to regulate and control the flow of air within the firing tube and to prevent damage to the air compressing apparatus and indicating device therefor when the firing tube is exploded by the explosive charge.

The signal received from the microphones arranged within the firing hose is transmitted by way of the electrical conductors within the flexible cable 38 to the signal amplifier 39 which may be of any type suitable for the purpose in which an incoming signal of predetermined characteristic such, for example, as a signal passed by a filter device within the amplifying mechanism is amplified by any suitable means such as a vacuum tube or the like connected to a source of electrical power, in which an output signal is generated by the signal amplifying device sufficient to operate a detonating device within the casing 41 connected to the amplifying device as by the electrical conductors within the cable 42. When this occurs, the operation of the detonator causes the detonating fuse or primacord 43 arranged within a flexible conduit or tube 44 extending between the detonating device and a housing 45 attached preferably to the towing member 12, to be fired thereby initiating an explosion within the firing hose.

On Fig. 5 is shown in enlarged form an arrangement of parts and instrumentalities suitable for connection to the line 21 of Fig. 4 whereby the firing hose is adapted to be towed through the water and the control circuits and connections thereto may be maintained concurrently with the towing operation. The towing member 12 comprises a flexible resilient tube or hose preferably of lesser diameter than the firing hose 11 and connected thereto by the coupling 46, Fig. 5, suitable hose clamps 47 and 48 of streamlined design being employed for maintaining the hose members 12 and 11 respectively attached to the coupling 46 in sealed relation thereto. The coupling 46 comprises an annular member 49 secured thereto in any well known manner for pivotally securing the swivel member 51 to the coupling 46 whereby the towing cable 15, Fig. 1, may be attached to the firing hose as by the eye 52 provided within the swivel member. Arranged within the firing hose 11 in abutting relation with the coupling 46 is a circular plate 53 having a centrally disposed aperture therein within which is arranged an eye bolt 54 secured thereto as by the nut 55 and washer illustrated. The plate is also provided with a plurality of apertures 56, Fig. 9, through which the compressed air is adapted to pass and a plurality of apertures 57 within which are arranged a pair of primacords 58 and the electrical cable 59, the primacords and electrical cable being preferably wrapped about the steel towing cable 61 secured at one end thereof to the eye bolt 54 and at the other end thereof to the cable clamp 62 passing through an aperture within the coupling member 63 and secured thereto as by the nuts 64.

The coupling member 63 is clamped to the flexible supply tube 12 and hermetically sealed with respect thereto in the manner illustrated by the hose clamps 65. There is provided within the member 63 a plurality of apertures 66, Fig. 7, through which the air is adapted to pass and a plurality of apertures 67 adapted to receive the cable 59 and the primacords 58. The primacords and electrical cable are sealed with respect to the coupling member 63 by a flexible packing member 68 of material suitable for the purpose such, for example, as rubber through which the primacords and cable extend, the packing member being tightly compressed by the plates 69 and 71 held together in clamped relation by the bolts 72 and nuts 73 thereby compressing the packing member sufficiently to engage a recessed portion 74 formed within the member 63 and establish an airtight joint therebetween. The plates 69 and 71 are each provided with a centrally arranged aperture in alinement with an aperture 75 within the packing member 68 and in communication with the coupling member 76 whereby compressed air from the flexible tube 37 secured thereto is admitted to the interior of the member 63.

Secured to the member 63 as by the bolts 78 and lock washers 79 is a V-shaped bolt 81 comprising an annular portion 82 having apertures therein within which the bolts 78 are adapted to pass thereby providing an arrangement suitable for connection to the towing cable or line 21. The electrical cable 59 is provided preferably with a plug and jack connection 83, Fig. 4, to facilitate the connection between the cable 59 and the cable 38 extending to the filter device within the signal amplifier. Fig. 10 shows a length of firing hose within which is arranged a plurality of cans or canisters 84 having an explosive charge therein such, for example, as TNT or an explosive known in the art as nitramon, each of the cans being somewhat less in diameter than the inside diameter of the firing hose. The cans may, if desired, be of the type in which the ends are adapted to be threaded together, although it will be understood that any other suitable type of can may be employed for containing the explosive charge. The end portions of the cans are supported by resilient bushings 85 of suitable material such, for example, as rubber, there being a recessed portion therein adapted to receive and support the ends of the canisters 84. The various bushings 85 are provided with suitable apertures therein adapted to support yieldably a cylindrical spacing member or weight 86 whereby the cans are maintained in predetermined space relation with respect to each other and, furthermore, by providing spacing members of different masses, such for example, as wood, iron, lead and the like, the weight of the firing hose may be adjusted to a predetermined degree such that the specific gravity of the hose is substantially the same as the surrounding water when inflated by the compressed air.

Each of the bushings 85 is provided with a plurality of axially arranged apertures 87 adapted to receive the primer fuses 58 whereby the primer fuses are supported by the resilient bushings in proximate relation with respect to the cans of explosives 84, each of the primer fuses being preferably wrapped about the cans and provided with a looped portion 88 intermediate adjacent cans of explosives thereby providing an arrangement in which the firing hose 11 may be flexed without injury or damage to the primer fuses. Each of the apertures 87 is made readily accessible to the entrance of the primer fuses or electrical cable 59, as the case may be, by reason of a slot 90 extending from each of the apertures to the periphery of the resilient bushing 85. It will also be understood that the cable 59 is also formed in a loop or otherwise loosely arranged between successive portions of the various bushings 85 thereby to prevent injury or damage to the cable as the firing hose 11 is flexed during the wrapping or unwrapping thereof about the reel 17 or the movement of the firing hose over the sheaves 19 as the hose is launched or withdrawn from the water.

The lengths of tubing comprising the firing hose 11 are connected together by a cylindrical member 89 preferably having raised portions 91 thereon to which the various lengths of flexible tubing are clamped in airtight relation thereto by the clamps 48. The cylindrical member 89 has apertures 92 diametrically arranged therein within which is disposed a piezo-electric or crystal type of microphone 93 having a pair of flexible conductors 94 connected thereto for establishing an electrical connection to the plug 95 adapted to engage a jack 96 and thereby complete an electrical circuit from the microphone to the conductors within the cable 59.

The end portions of the microphone are preferably sealed to the cylindrical member 89 adjacent the apertures 92 therein thereby to prevent the entrance of water or moisture within the firing hose which might otherwise occur and interfere with the operation of the microphone. About the cylindrical member 89 and in abutting relation with respect to the ends of the adjacent flexible firing hoses connected thereto is a resilient sleeve 97 of flexible material suitable for the purpose such, for example, as rubber clamped thereto in any suitable manner as by the flexible rod or wire 98 wrapped tightly thereabout and secured at the ends thereof in a manner to prevent the unwinding or loosening of the wire.

An arrangement is thus provided in which supersonic signals may be received through the surrounding water by the microphones 93, the signals passing through the flexible cylindrical member 97 with practially no reduction in the strength or force of the signal whereby the microphones are maintained in effective communication with the surrounding water in a condition to receive signals transmitted therethrough without the possibility of the water coming into contact with or otherwise causing deterioration or damage to the microphones. There is also provided a streamlined sleeve or foil 99 about the firing hose on opposite sides of the flexible member 97 thereby to minimize the effect of turbulence within the water caused by the movement of the firing hose therethrough and adapted to effect a corresponding reduction in the intensity of the supersonic signal received as a result of the movement of the hose through the water thereby providing an arrangement in which the supersonic signal received by the microphones is produced almost entirely by the torpedo and thus the possibility of accidental or premature detonation of the firing hose is prevented. It will, of course, be understood that a sufficient length of primacord is available at the junction of each of the lengths of flexible hose comprising the firing hose to enable the primacord to be twisted together or knotted in a manner sufficient to insure that the detonation of the primacord will continue throughout the entire length of the firing hose in response to a supersonic signal received from the torpedo by any of the microphones arranged therein.

The firing hose 11 is provided with a conical cap 100 to which the hose is clamped in airtight relation thereto by the clamps 48, the clamps being covered preferably with a streamline sleeve 101. The tapered end of the cap is provided with a plurality of slots 102 within which is arranged the tail fins 103 and 104 and secured thereto as by the pins 105 passing through suitable apertures within the tail fins and the cap. The tail fins are additionally maintained in predetermined position with respect to each other in any suitable manner by the L-shaped members 106 secured thereto as by the rivets 107. By providing a tail piece comprising the fins 103 and 104 in the manner illustrated there is no possibility of the trailing end of the firing hose weaving or twisting within the water as the hose is towed through the water by the towing vessel. The primacords 58 are preferably knotted as at 108 or otherwise prevented from being pulled ahead into the firing tube thereby to insure that the primacord will extend throughout the entire length of the firing tube at all times and thus the entire explosive charge will be exploded whenever the primacord is fired.

On Fig. 19 is shown another embodiment of the present invention adapted to protect the entrance to the inlet or harbor 109. In the specific arrangement illustrated on Fig. 19, a pair of firing hoses 111 are employed, each firing hose being connected at one end thereof to an anchor 112 as by the mooring cable 113, a float 114 being connected to the cable 113 as at 115 for maintaining the end of the firing hose at a predetermined depth of submersion within the body of water. The firing hose 111, it will be noted, is adjusted preferably to a positive buoyancy and maintained at the predetermined depth of submersion within the water by the anchors or weights 116 arranged on the bed of the body of water to which the cable 111 is connected at regular intervals as by the mooring cables 117. However, if desired, the firing hose may be adjusted to a negative buoyancy and maintained at a predetermined depth of submersion by suitable floats connected at intervals along the hose.

The other end of the firing hose 111 is connected by a suitable supply hose 118, preferably of somewhat less diameter than the firing hose, the hose 118 extending upward through a curved tubular member 119 supported by the members 121 and post 122 on the barge 123, the curved member 119 being additionally attached to the barge as by the brace 124. The tubular member 119 is provided preferably with grooved pulleys 125 supported in any convenient manner as by the flexible arms 126 attached to the lower end of the tubular member through which the flexible hose 118 is adapted to pass.

The firing hose 111 is also moored at or near the point of connection with the hose 118 by the mooring cable 127 connected to the anchor or weight 128. The upper end of the tubular member 119 is provided preferably with a grooved pulley 129 over which the supply hose 118 is adapted to pass. The supply hose 118 is hermetically sealed at 131 to the firing hose 111 and provided at the other end thereof with a suitable cap 132 generally similar to the coupling member 63 whereby the supply hose and firing hose are adapted to be maintained in an inflated condition by a supply of compressed air from the air compressor thereby to maintain a predetermined degree of buoyancy of the firing hose at all times. The compressed air is passed through a dehydrating chamber 134 and thence through the flexible tube 135 to the flexible tube 136 extending within the cap 132 and in communication with the interior of the tubes 118 and 111. The air supply system is provided with a plurality of valves and air gauges generally in the manner of Fig. 4 whereby the pressure within the firing tube may be maintained within predetermined limits, the operation of the air compressor being automatically controlled by means of any well known device suitable for the purpose.

The firing hose 111 is sealed at one end thereof by a cap 130 and provided with a plurality of microphones 137 adapted to generate an electrical signal in response to impulses received from a torpedo, the signals being transmitted by way of the electrical cable 138 to the signal amplifying device 139, a suitable filter device being employed preferably within the amplifying device to facilitate the passage through the amplifier of signals of the type generated by a torpedo to the exclusion of other signals received by the microphones 137. When the signal received from the torpedo has increased to a predetermined degree of strength the output signal from the amplifier 139 is transmitted by way of the electrical cable 141 to the detonating device 142 thereby firing the primer fuse 143 and exploding the explosive charge within the firing hose. The barge 123, it will be noted, is maintained in a predetermined location by the anchors 144 and mooring cables 145 secured thereto. The control apparatus on the barge is preferably protected from the weather by a suitable housing 146.

Whereas in Fig. 19 two firing hoses 111 with their associating control equipments are shown extending across the entrance to the harbor 109, it will be understood, that this has been done for the purpose of illustration and that additional firing hoses and control equipments may be provided without departing from the principle and scope of the present invention. The arrangement of Fig. 19 is adapted to deflect and destroy two torpedoes without replenishing the firing hoses, each of the firing hoses being spaced from the adjacent firing hose for a distance sufficient to prevent the premature explosion of the second hose by the countermining action from the first hose as the first hose is exploded by the first torpedo.

Fig. 22 shows in diagrammatic form an electrical circuit arrangement suitable for use with the present system. In Fig. 22 the microphone elements 93 are connected in parallel to the pair of conductors 147 extending to the input terminals 148 of a high pass input filter 149 adapted to pass only signals of a predetermined frequency characteristic such, for example, as supersonic signals received from a torpedo having a predetermined frequency band.

The output terminals 151 of the high pass input filter are connected by the conductors 152 to the input terminals 153 of the signal amplifier SA of any type suitable for the purpose such, for example, as a vacuum tube amplifier in which the source of electrical energy required for the operation of the amplifier is obtained from the battery BA connected thereto. Whereas in Fig. 22 the filter device is shown connected to the signal amplifier by the conductors 152, it will be understood that this has been done for the purpose of description and the filter device may, if desired, be included within the signal amplifier or connected to the output terminals 154 thereof. The output terminals 154 of the signal amplifier are connected as by the conductors 155 to the detonating device D, a filter device being arranged, if desired, between the signal amplifier unit and the detonator in addition to the filter device connected to the input terminals 153. As the detonator D operates, the primer fuse 58 is fired thereby exploding the explosive charge within the firing hose and effectively destroying the torpedo.

Fig. 23 shows an alternative arrangement of the microphones 93 suitable for use with firing hoses of relatively great length in which the number of microphones required to detect the presence of a torpedo at any point throughout the length of the firing hose is increased, each of the microphones being arranged in such a manner as to prevent the relatively low resistance shunt across the microphones as a result of the remaining microphones connected in parallel thereto. In the arrangement of Fig. 23 each of the microphones 93 is connected in parallel with the primary winding of a suitable transformer T, the secondary windings of the transformers being of relatively high impedance and connected together and to the input terminals of the high pass input filter 149 by the conductors 156.

In the arrangement of Fig. 24 each of the microphones 93 is arranged in series with a rectifying device 157 of any type suitable for the purpose such, for example, as a copper oxide rectifier or similar device whereby unidirectional currents are received by the signal amplifier from the microphones and the shunting effect of the remaining microphones is greatly reduced. The microphones 93 and associated rectifying elements 157 are connected in parallel to the conductors 158 extending to the high pass input filter 148.

On Fig. 25 is shown a torpedo indicated generally by the numeral 159 approaching the firing hose 11 prior to the explosion of the hose by signals received from the torpedo.

Figure 26:
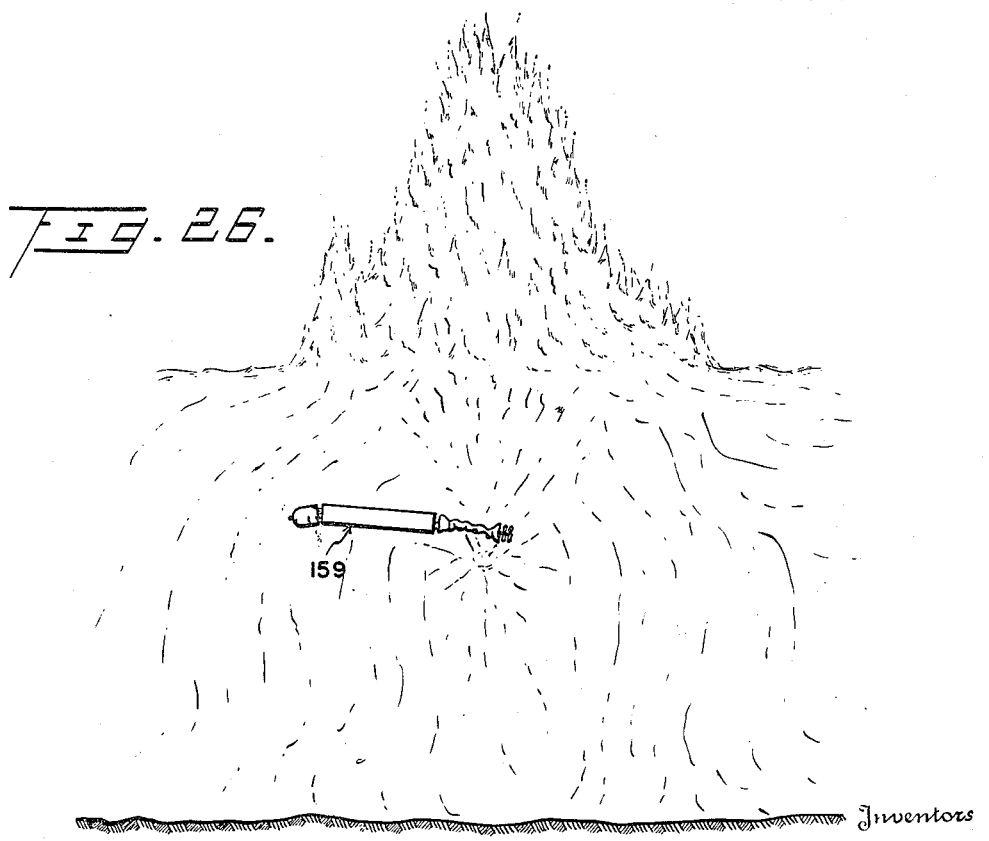
Fig. 26 shows the destructive effect of the explosion of the firing tube on the torpedo.

Fig. 26 shows the destructive effect caused by the explosion of the firing hose 11, the torpedo 159 being partly torn asunder and demolished sufficiently to render the torpedo ineffective. Whereas in Fig. 26 the explosion is shown in proximate relation with respect to the tail of the torpedo, it will be understood that this has been done for illustrative purposes and the explosion may occur adjacent the war head of the torpedo or at any point along the torpedo body. Furthermore, the war head may be exploded by the explosion of the firing hose 11 thereby completely shattering the torpedo at a safe distance from the towing vessel and from other vessels within the convoy protected by the system of the present invention. In any event the torpedo is invariably stopped within its length and sufficiently damaged by the present system to release the air imprisoned therein and cause the torpedo to sink to the bottom or to be completely demolished by exploding the war head thereof.

Briefly stated in summary, the present invention provides new and improved means comprising a flexible firing tube or hose having an explosive charge therein adapted to be exploded by signals received from a torpedo by detecting devices arranged within the hose at predetermined distances throughout the length thereof whereby the explosion occurs when the torpedo is adjacent the firing hose. Furthermore, the invention in its various aspects contemplates the provision of new and improved means for controlling the buoyancy of the firing hose continuously and the arrangement of an explosive charge and detecting means therein whereby the firing hose is sufficiently flexible to be wrapped about a hose or cable reel and unwound therefrom without disarranging any of the parts and instrumentalities therein. An arrangement is thus provided in which the firing hose may be towed behind a moving vessel or moored within a body of water, as the case may be, thereby effectually to destroy a torpedo moving within the vicinity of the device.

While the invention has been described in detail with reference to several specific examples which give satisfactory results, it will be understood by those skilled in the art, after understanding the invention, that various changes and modifications may be made without departing from the spirit and scope of the invention, and it is our intention therefore in the appended claims to cover all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. In a device of the character disclosed for destroying a torpedo, a flexible tubular member arranged within the water and having an explosive charge therein, means for inflating said tubular member to a predetermined degree of pressure, means arranged within said tubular member for detecting a torpedo by signals received through the water, and means controlled by said detecting means for firing said explosive charge when the torpedo is adjacent said tubular member.

2. In a device of the character disclosed for disabling a torpedo, a flexible tubular member having a plurality of microphonic devices in spaced relationship therein adapted to generate an electrical signal in response to impulses received from the torpedo, means for maintaining said tubular member continuously inflated, a signal amplifying device, means for operatively connecting said microphonic devices to the input of said signal amplifying device, a plurality of explosive charges arranged throughout the length of said tubular member, detonating means operatively connected to each of said explosive charges, and means controlled by said signal amplifying device for causing the explosive charge to be fired by said detonating means in response to impulses received by said microphonic devices.

3. In a system of the character disclosed for destroying a torpedo, a flexible tubular member arranged within a body of water and having a plurality of explosive charges arranged therein, buoyancy control means including a continuous supply of compressed air operatively connected to said tubular member for maintaining the tubular member at a predetermined depth of submersion within the water, means for supporting said explosive charges in predetermined space relation within said flexible tubular member, a plurality of microphonic devices within said tubular member adapted to generate electrical signals in response to impulses received from the torpedo, a signal amplifying device operatively connected to said plurality of microphonic devices and adapted to be controlled thereby, detonating means operatively connected to each of said explosive charges, and means responsive to the electrical signals received by said signal amplifying device for causing said explosive charges to be fired by said detonating means selectively in accordance with the strength of signals received from said microphonic devices.

4. In a device of the character disclosed for destroying a torpedo, the combination of a vessel, a flexible firing tube having an explosive charge therein arranged within the water and adapted to be towed by said vessel, means for hermetically sealing one end of said firing tube, a supply tube operatively connected to the other end of said firing tube in sealed relation thereto, means including a coupling member for attaching said supply tube to said vessel, a flexible tensile member arranged within said supply tube and connected at one end thereof to said coupling member, means for connecting the other end of said tensile member to said firing tube whereby the towing force is applied to said firing tube by said tensile member, a plurality of microphonic means arranged within said firing tube adapted to generate electric signals in response to impulses received through the water from a torpedo, signal amplifying means arranged on said vessel, means for operatively connecting said plurality of microphonic means to said signal amplifying means, means controlled by said signal amplifying means for exploding the explosive charge in response to signals of predetermined character received from said microphonic means, a plurality of float members secured at intervals to said firing tube for maintaining the firing tube at a predetermined depth of submersion within the water, and means for continuously maintaining a predetermined pneumatic pressure within said firing tube.

5. An ordnance weapon of the character disclosed for destroying a torpedo comprising a flexible firing tube arranged within the water, a vessel, means secured to said vessel for towing the firing tube through the water at a distance from the vessel, a plurality of containers having an explosive charge therein, a plurality of resilient bushings for yieldably supporting said containers within said firing tube, each of said bushings having an aperture in the central portion thereof, a plurality of weights respectively disposed within the apertures of said bushings for imparting a predetermined degree of buoyancy to the firing tube, a plurality of floats connected to said firing tube at intervals for maintainin the firing tube at a predetermined depth of submergence within the water, means for continuously maintaining a predetermined degree of pressure within said firing tube sufficient to prevent the collapse of the firing tube by the pressure of the surrounding water, a plurality of devices arranged within the firing tube for detecting the approach of a torpedo, and means controlled by said detecting devices for firing the explosive charges within said containers when the torpedo has approached within a predetermined distance of said firing tube.

6. In a device of the character disclosed for disabling a torpedo, the combination of a flexible tube arranged within a body of water, a plurality of detecting devices arranged at intervals within said flexible tube having means for generating electrical signals in response to impulses received from the torpedo, a plurality of cans of explosive charges, a plurality of resilient supports arranged within said flexible tube having recessed portions therein adapted to receive and support said cans in substantially alined space relation, means for detonating the explosive charge within each of said cans, and means responsive to the electrical signals received from said signal generating means for causing said explosive charges to be exploded by said detonating means.

7. A device for destroying a torpedo comprising a flexible tube arranged within the water, a plurality of explosive charges arranged at predetermined intervals within said flexible tube, means including a signal amplifying device for detonating said explosive charges, a plurality of detecting devices arranged within said flexible tube adapted to apply signals to said signal amplifying device variably in accordance with impulses received from the torpedo thereby to cause the explosive charges to be exploded by said detonating means when the impulses have increased to a predetermined degree of strength, a source of compressed air, a duct for supplying said compressed air from said source to said flexible tube whereby to prevent the collapse of the tube by the pressure of the surrounding water, and a plurality of valve devices intermediate said source of compressed air and said flexible tube for preventing injury to the source of compressed air as the explosive charges are exploded by said detonating means.

8. In a device of the character disclosed for protecting a vessel from the ravage of a torpedo, a firing tube having an explosive charge therein arranged within the water and adapted to be towed by the vessel, means including an electro-responsive device for firing said explosive charge, a plurality of detecting devices arranged within the firing tube having means for generating electrical signals in response to supersonic signal indications received through the surrounding water, a signal amplifier controlled by the electrical signals received from said detecting devices adapted to operate said electro-responsive firing means when the signals have increased to a predetermined degree of strength, and means secured at intervals to said firing tube for preventing the generation of supersonic signals of strength sufficient to operate said electro-responsive firing means by movement of the firing tube through the water.

9. In a device of the character disclosed for protecting a vessel against attack by a torpedo, a flexible tubular member arranged within the water and having a plurality of explosive charges therein, detecting means within said tubular member for generating an electrical signal in response to impulses received from the torpedo, a plurality of floats connected at intervals to said tubular member for maintaining the tubular member at a predetermined depth of submersion within the water, means for inflating said flexible tubular member thereby to adjust the buoyancy of the tubular member to a predetermined negative value, and means controlled by said detecting means for firing said explosive charges when the torpedo is adjacent said tubular member.

10. In a device of the character disclosed for destroying a torpedo, the combination of a flexible firing hose arranged within the water and having an explosive charge therein, means for firing said explosive charge, a plurality of microphonic devices arranged within said tubular member for operating said firing means selectively in accordance with the strength of signals received through the water, means including a continuous supply of compressed air for maintaining said flexible tubular member at a predetermined depth of submersion within the water, and means for dehydrating said compressed air sufficiently to prevent the condensation of water vapor within said tubular member.

11. In a device of the character disclosed for destroying a torpedo, the combination of a flexible tubular member having a plurality of detecting devices therein for generating signals variably in accordance with the strength of impulses of predetermined character received through the water, an explosive charge arranged within said flexible tubular member, means controlled by signals received from said detecting devices for firing said explosive charge, a duct connected to said tubular member, means for applying pneumatic pressure continuously to said duct to maintain said tubular member extended to a predetermined degree of inflation within the water, and means for dehydrating the air applied under pressure to said flexible tubular member.

12. In a device for protecting a convoy from torpedo attack, the combination of a pair of firing hoses arranged within the water, each of said firing hoses having an explosive charge disposed therein, signal detecting means within each of said firing hoses, a vessel, a pair of cables attached to said vessel, a pair of coupling devices for securing the firing hoses to said cables respectively, each of said coupling devices having a swivel connection thereon, a plurality of means respectively secured to each of said swivels for maintaining said pair of firing hoses in predetermined space relation with respect to each other as the hoses are towed through the water by the vessel, and means arranged within each of said firing hoses for exploding the respective explosive charge in response to signals of predetermined character received by said signal detecting means.

13. An anti-torpedo device comprising a flexible firing tube arranged within the water and having a plurality of groups of explosive charges therein, a plurality of microphonic devices disposed within said firing tube intermediate each of said groups of explosive charges, a vessel having a line secured thereto adapted to tow the firing tube through the water, a coupling member for attaching said firing tube to said line, said coupling member having a swivel device connected thereto, a float connected to said swivel device for maintaining the leading end of said firing hose at a predetermined depth of submersion within the water, a plurality of additional floats connected at intervals throughout the length of said firing hose to maintain the remainder of the firing hose at said predetermined depth of submersion, a tail member secured in sealed relation to the trailing end of said firing hose having means for guiding the firing hose along a predetermined path of travel as the firing hose is towed through the water, and means for exploding said groups of explosive charges simultaneously in response to impulses of predetermined character received through the water by said microphonic devices.

14. In a device of the character disclosed for exploding a torpedo at a safe distance from the target, the combination of a flexible tubular member arranged within a body of water and having a plurality of groups of cans of explosive charges therein, a plurality of resilient spacing members disposed within said flexible tubular member adapted to support said cans yieldably in substantial coaxial relation to said member whereby the tubular member is adapted to be flexed, a plurality of microphonic devices, means for supporting said microphonic devices within said tubular member intermediate said groups of cans, signal amplifying means, a plurality of electrical conductors for operatively connecting each of said microphonic devices to said signal amplifying means, an electro-responsive detonating device adapted to be operated by said signal amplifying means in response to signals received from said microphonic devices, a primer fuse adapted to be fired by said electro-responsive detonating device, said primer fuse being operatively connected to each can of explosive charge, and means included within each of said resilient spacing members for supporting said electrical conductors and said primer fuse.

15. In a device of the character disclosed for destroying a torpedo, the combination of a flexible tubular member arranged within a body of water and having a plurality of cans of explosive charges therein, means for sealing one end of said tubular member, means for continuously applying a predetermined degree of pneumatic pressure to the other end of said tubular member, means for yieldably supporting said plurality of cans in predetermined space relation in substantial coaxial alinement with said tubular member, a plurality of annular raised sections on said supporting means closely fitted within said tubular member, each of said sections having a plurality of axially arranged apertures therein, a plurality of microphonic devices arranged at intervals within said tubular member adapted to generate electrical signals in response to supersonic impulses received through the water, an electrical cable arranged within one of the apertures of each of said annular sections for establishing an external connection to said microphonic devices, a signal amplifier operatively connected to said electrical cable, electro-responsive detonating means controlled by said signal amplifier, said detonating means including a priming fuse in operative connection with each of said cans and disposed within another of said apertures of each of said annular sections, and means for excluding water from the interior of said flexible tubular member.

16. An anti-torpedo device comprising a flexible firing tube arranged within a body of water, an explosive charge disposed within the firing tube, means controlled by impulses of predetermined character received through the water for firing said explosive charge, a plurality of floats connected to said firing tube, and means for inflating said firing tube thereby to control the weight to be supported by said plurality of floats.

17. In a device of the character disclosed for protecting a vessel against an attack by a torpedo, a firing tube comprising a plurality of lengths of flexible tubing arranged within a body of water, means including a plurality of coupling members for connecting said lengths of tubing, each of said coupling members having a pair of diametrically arranged apertures therein, a plurality of microphonic devices respectively disposed within the apertures of each of said coupling members in sealed relation thereto, a plurality of resilient sleeves respectively arranged about each of the coupling members in substantial abutting relation with the ends of the lengths of tubing secured thereto, means for clamping each resilient sleeve to the associated coupling member thereby to exclude water from the microphonic devices, a plurality of explosive charges respectively arranged within each length of tubing intermediate said microphonic devices, and means controlled by said microphonic devices in response to impulses of predetermined strength received through the water and said resilient sleeves for causing said explosive charges to be simultaneously exploded.

18. An anti-torpedo device comprising a plurality of sections of flexible tubing arranged within a body of water, a plurality of explosive charges respectively arranged within each of said sections of tubing, a plurality of coupling devices for connecting the sections of tubing together, a plurality of microphonic devices respectively arranged within each of said plurality of coupling devices in operative communication with the water, a plurality of pairs of electrical conductors respectively connected to said microphonic devices and disposed within each section of tubing, means for electrically connecting said pairs of conductors together in parallel, a filter device operatively connected to said connecting means and adapted to pass electrical signals of a predetermined frequency band set up by said microphonic devices in response to supersonic impulses received through the water, a signal amplifying device having the input terminals thereof operatively connected to said filter device, electro-responsive detonating means controlled by said signal amplifying device, and means operatively connected to said electro-responsive detonating means for simultaneously firing all of said explosive charges as the electro-responsive detonating means is operated by said signal amplifying device.

19. In a device of the character disclosed for prematurely exploding a torpedo, the combination of a flexible tubular member arranged within a body of water and having a plurality of groups of cans of explosive charges therein, a plurality of resilient spacing members disposed within said flexible tubular member adapted to support said cans yieldably in substantial coaxial relation to said tubular member whereby the tubular member is adapted to be flexed, a plurality of microphonic detecting devices, means for supporting said microphonic devices within said tubular member intermediate said groups of cans, a signal amplifier, a plurality of electrical conductors for operatively connecting each of said microphonic devices to said signal amplifier, detonating means including a pair of primer fuses operatively connected to each of said cans of explosive adapted to be operated by said signal amplifier in response to signals received from said microphonic devices, and a plurality of slotted portions within each of said resilient spacing members for supporting said electrical conductors and said primer fuses at intervals throughout the length of said flexible tubular member.

20. In an anti-torpedo device of the character disclosed adapted to be towed through the water by a vessel, the combination of a flexible firing hose sealed at one end thereof and having an explosive charge therein, a flexible supply tube of lesser diameter than said firing hose having a cap member at one end thereof, means for coupling the other end of said supply tube to said firing hose, means including a flexible steel cable arranged within said supply tube for establishing a mechanical connection between said cap member and said coupling means whereby the towing strain of the firing hose is removed from said supply tube, a flexible duct connected to said cap member, means for maintaining a continuous supply of compressed air within said duct whereby the supply tube and firing hose are inflated to a predetermined degree of buoyancy, a plurality of microphonic devices arranged within said firing hose for detecting the approach of a torpedo by impulses received from the torpedo through the water, a pair of signal conductors connected to said microphonic devices and disposed within said control tube for establishing an external electrical connection to said microphonic devices, a signal amplifying device operatively connected to said signal conductors and adapted to be controlled by signals received from said microphonic devices, electro-responsive detonating means controlled by said signal amplifying device, a fuse element arranged within said supply tube and in operative connection with said explosive charge adapted to explode the explosive charge in response to the operation of said detonating means, and means for sealing said signal conductors and fuse element to said cap member.

21. In an anti-torpedo device of the character disclosed, the combination of a flexible hose member having an explosive charge therein adapted to be towed through the water, a vessel having a rotatable reel thereon adapted to support said flexible hose, means including a grooved pulley for launching said flexible hose within the water as the hose is unwound from said reel, means for securing one end of the hose in towing relation to the vessel, microphonic means arranged within said flexible hose member for detecting the approach of a torpedo within the vicinity thereof, and means including a firing control mechanism on said vessel adapted to explode said explosive charge in response to signals of predetermined character received from said detecting means.

22. In a system of the character disclosed for protecting a harbor against torpedo attack, a flexible tubular member having a plurality of explosive charges therein, means operatively connected to said tubular member for maintaining a sufficient degree of inflation thereof to insure positive buoyancy of the member within the water, a plurality of mooring devices secured to said tubular member at intervals for maintaining the tubular member at a predetermined depth of submergence within the water across a substantial portion of the entrance of said harbor, a plurality of microphonic devices arranged at intervals within said tubular member for generating signals variably in accordance with impulses of predetermined character received through the water from the torpedo, and means controlled by said microphonic devices for firing said plurality of explosive charges when said impulses have reached a predetermined degree of strength.

23. In a device of the character disclosed for destroying a torpedo, the combination of a flexible tubular member having a plurality of microphonic detecting devices therein adapted to generate electrical signals of variable strength in accordance with the strength of impulses of predetermined character received through the water, a plurality of explosive charges arranged within said flexible tubular member intermediate said microphonic detecting devices, a pair of signal conductors arranged within said tubular member, means including a plurality of current rectifying devices respectively connected to each of said microphonic detecting devices for operatively connecting the detecting devices to said pair of signal conductors, signal amplifying means operatively connected to said pair of signal conductors and adapted to be controlled by rectified electrical signals from said microphonic detecting devices, and means controlled by said signal amplifying means for selectively firing said explosive charges in accordance with the strength of signals received from said microphonic detecting devices.

24. A system of the character disclosed for protecting vessels within a harbor from attack by a torpedo comprising a flexible firing tube having an explosive charge therein, means for mooring said firing tube at a predetermined depth of submersion within the water across the entrance of said harbor, a float, means for mooring said float adjacent one end of said firing tube, a firing control mechanism arranged on said float, a plurality of microphonic devices disposed within said firing tube adapted to detect impulses of predetermined character received through the water from a torpedo, a plurality of electrical conducting means for connecting said microphonic devices to said firing control mechanism, a supply tube intermediate said firing tube and said firing control mechanism within which said electrical conducting means are disposed, a source of compressed air on said float in connection with said supply tube for maintaining said flexible firing tube inflated to a predetermined degree of pressure, a plurality of explosive charges arranged within said firing tube intermediate said microphonic devices, and means for firing said explosive charges when said impulses of predetermined character received by said microphonic devices have reached a predetermined degree of strength.

25. An anti-torpedo device comprising a flexible tubular member arranged within the water, means for sealing one end of said tubular member, a cylindrical coupling member connected to the other end of said tubular member having a recessed portion therein, yieldable means having a plurality of apertures therein arranged within said cylindrical coupling member, means for compressing said yieldable means sufficiently to engage said recessed portion of the coupling member in airtight relation thereto, means for causing air to flow through one of said apertures thereby to maintain said tubular member inflated to a predetermined degree of pressure, detecting means arranged within said tubular member adapted to generate electrical signals in response to impulses of predetermined character received through the water, a pair of signal conductors connected to said detecting means extending through others of the apertures of said yieldable means in sealed relation thereto for establishing an external circuit connection to said detecting means, means operatively connected to said signal conductors for amplifying the electrical signals received from said detecting means, detonating means controlled by said signal amplifying means, a pair of fuse devices extending through the remaining apertures within said yieldable means in sealed relation thereto adapted to be fired by said detonating means, and an explosive charge arranged within said flexible member adapted to be exploded by said pair of fuse devices.

26. An anti-torpedo device comprising a flexible firing tube adapted to be towed through the water by a vessel, an explosive charge disposed within the firing tube, means controlled by impulses from the torpedo received through the water for firing said explosive charge, and means for inflating said firing tube to a predetermined degree of pressure while the tube is towed by said vessel.

27. An anti-torpedo device comprising a flexible firing tube arranged within a body of water and adapted to be towed by a vessel, means including a line for establishing a towing connection between the firing tube and the vessel, a fluid connection within said line in communication with the firing tube, and means on said vessel for applying pressure to said fluid connection thereby to maintain the firing tube and control line continuously inflated to a predetermined degree of pressure while the firing tube is being towed by the vessel.

28. A device of the character disclosed for destroying a torpedo, in combination, a flexible tubular member arranged within the water and having an explosive charge therein, a tubular towing line connected to said tubular member for establishing a towing connection thereto from a moving vessel, an explosive train within said tow line and operatively connected to said explosive charge, means within the tubular member for detecting the torpedo by signals received through the water, and means on said vessel and controlled by said detecting means for firing said explosive train and charge when the torpedo is adjacent said tubular member.

29. In a device of the character disclosed for destroying a torpedo, in combination, a flexible tubular member having a plurality of hydrophones in spaced relation therein adapted to generate an electrical signal in response to impulses received from the torpedo, a plurality of explosive charges arranged throughout the length of said tubular member, detonating means operatively connected to each of said explosive charges, a tubular tow line having a strain member therein for establishing a towing connection between said tubular member and a moving vessel, means on said vessel for maintaining said tow line and tubular member continuously inflated to a predetermined degree of pressure, and means on the vessel controlled by said hydrophones for causing the explosive charges to fire in response to impulses received by said hydrophones.

30. An anti-torpedo device comprising a flexible firing tube arranged within a body of water and adapted to be towed by a vessel, means including a line for establishing a towing connection between the firing tube and the vessel, a fluid connection within said line in communication with the firing tube and having a predetermined pressure therein, a second flexible firing tube arranged within the water and adapted to be towed by the vessel, means including a second line for establishing a towing connection between the second firing tube and the vessel, a fluid connection within said second line in communication with the second firing tube and having a predetermined pressure therein, means individual to each of said firing tubes for maintaining the firing tubes in predetermined spaced relationship within the water, means within the first named firing tube for detecting the approach of a torpedo, means controlled by said detecting means for selectively firing the first named firing tube, means within the second firing tube for detecting the approach of a torpedo, and means controlled by the last named detecting means for selectively firing said second firing tube, each of said flexible tubes being adapted to be fired regardless of the signals received by the microphone within the other firing tube.

31. In a device of the character disclosed for protecting a vessel against an attack by a torpedo, a plurality of lengths of flexible tubing, a plurality of sleeve-like coupling members for connecting said plurality of lengths of tubing end to end to form an underwater streamer adapted to be submerged in a body of water, a plurality of microphonic devices arranged respectively within said plurality of coupling members in sound transmitting relation with respect to the surrounding water, a plurality of explosive charges respectively arranged within each length of tubing intermediate said microphonic devices, and means controlled by said microphonic devices in response to impulses of predetermined strength received through the water for causing said explosive charges to be simultaneously exploded.

32. In a device of the character disclosed of protecting a vessel against an attack by a torpedo, a plurality of lengths of flexible tubing, a plurality of connecting sleeves, means including said plurality of connecting sleeves for connecting said plurality of lengths of tubing end to end to form a stream adapted to be submerged in a body of water, a plurality of transducer means of a type adapted to generate electrical signals upon application of pressure impulses thereto, means for supporting said plurality of transducer means respectively within said plurality of connecting sleeves in pressure transmitting relation with respect to the surrounding water, a plurality of explosive charges respectively arranged within said plurality of lengths of tubing, and means controlled by signals generated by the transducer means in response to impulses of predetermined strength received through the water for causing said explosive charges to be simultaneously exploded.

33. In a device of the character disclosed for protecting a vessel against an attack by a torpedo, an underwater streamer comprising a plurality of lengths of flexible tubing each having an explosive charge arranged therein, a plurality of interconnecting sleeves disposed respectively between adjacent pairs of said lengths of tubing, a plurality of piezoelectric transducer means disposed respectively within said plurality of interconnecting sleeves in sound transmitting relation to the surrounding water, and means for mounting each one of said plurality of transducer means so that the direction of contraction and expansion thereof lies transversely of the sleeve individual thereto, and means controlled by said transducer means in response to impulses of predetermined strength received through the water for causing said explosive charges to be simultaneously exploded.

References Cited in the file of this patent

UNITED STATES PATENTS 1,310,568     Heap et al. _____ July 22, 1919